May 1, 1962 P. E. OLSON 3,031,853
MULTI-POSITION FLUID MOTOR AND CONTROL APPARATUS THEREFOR
Filed Sept. 21, 1960 4 Sheets-Sheet 1

INVENTOR.
Paul E. Olson
BY
*A. A. Steinmiller*
Attorney

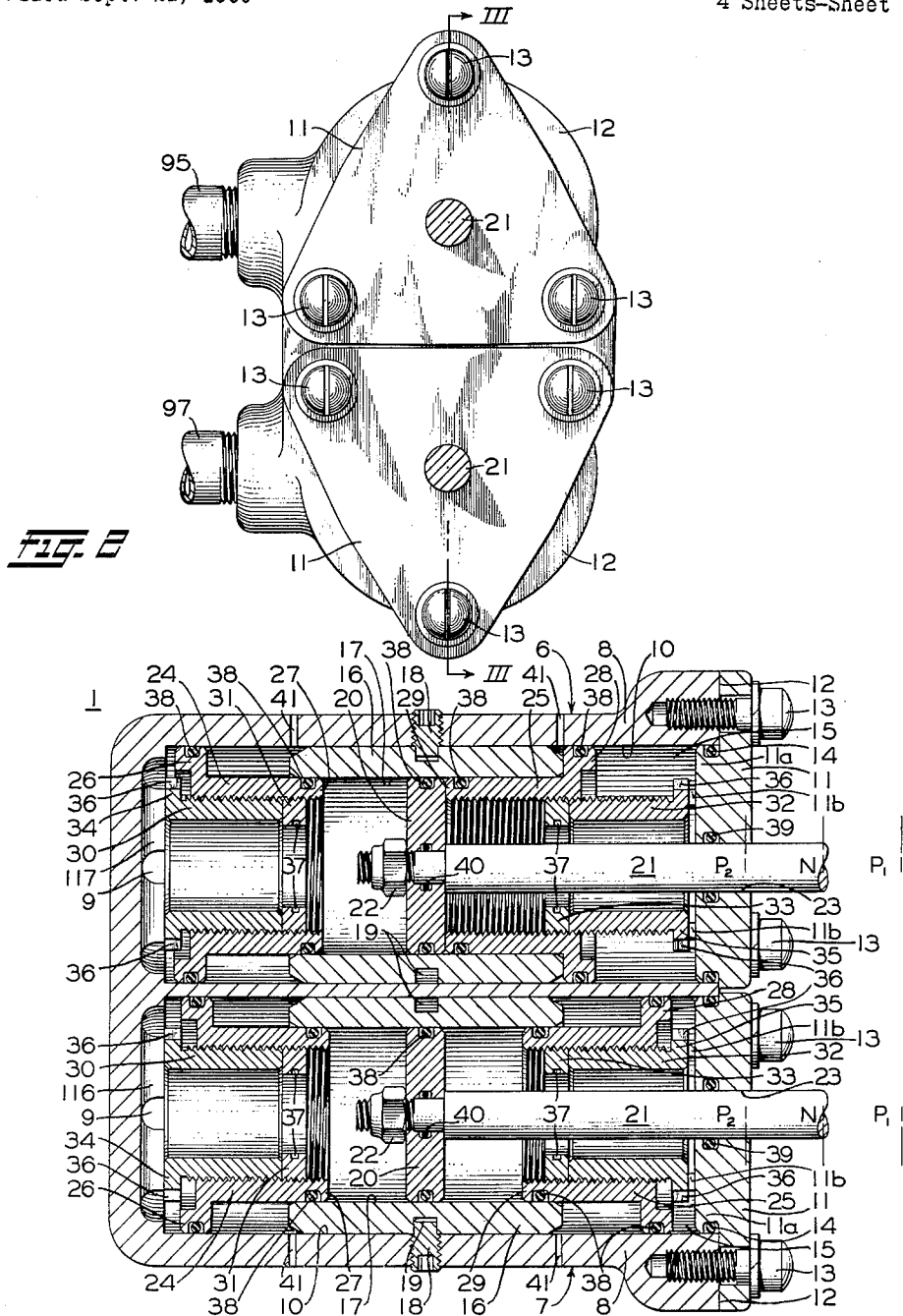

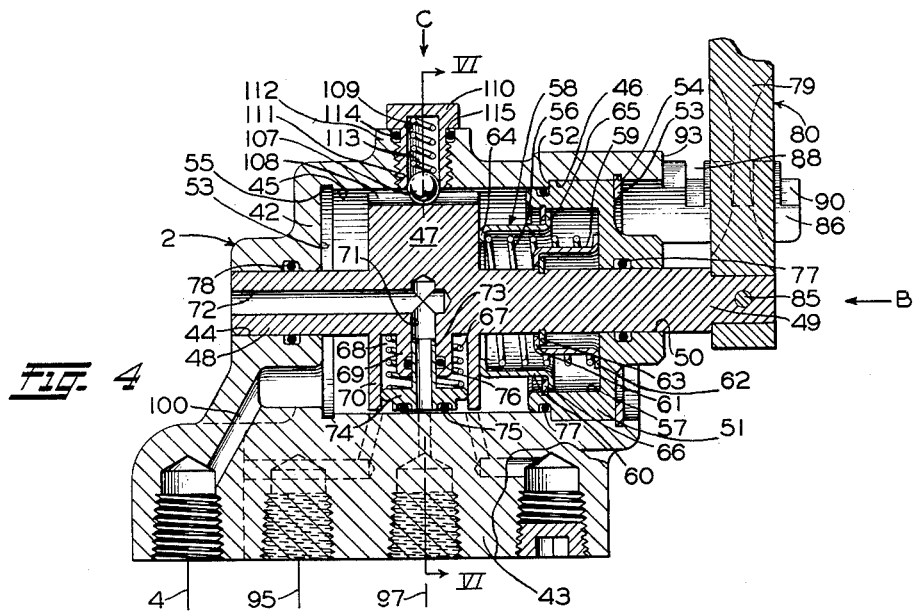
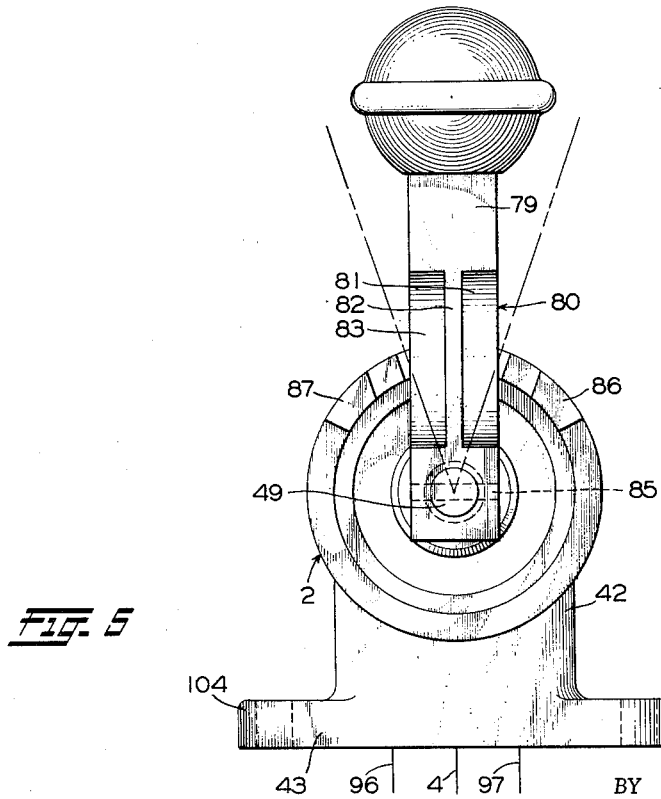

May 1, 1962  P. E. OLSON  3,031,853
MULTI-POSITION FLUID MOTOR AND CONTROL APPARATUS THEREFOR
Filed Sept. 21, 1960  4 Sheets-Sheet 4

INVENTOR.
Paul E. Olson
BY
O. A. Steinmeier
Attorney

United States Patent Office
3,031,853
Patented May 1, 1962

3,031,853
MULTI-POSITION FLUID MOTOR AND CONTROL
APPARATUS THEREFOR
Paul E. Olson, Pittsburgh, Pa., assignor to Westinghouse
Air Brake Company, Wilmerding, Pa., a corporation of
Pennsylvania
Filed Sept. 21, 1960, Ser. No. 57,509
14 Claims. (Cl. 60—97)

This invention relates to fluid pressure operated motors and manually operated control apparatus therefor, and more particularly to fluid motors capable of being controlled to positively provide a plurality of different fixed positions of one or more actuating rods employed for any desired function or purpose.

The term "fluid motor" refers to one or more cylinders provided with one or more pistons and chambers to which chambers fluid under pressure may be supplied and from which fluid under pressure may be released to move the piston or pistons to different positions within the cylinder or cylinders to control the operation of, for example, a multi-position power transmission unit.

Operation of each set of gears in a transmission unit by one multi-position power cylinder of a multi-cylinder fluid motor requires that the power piston of the one multi-position power cylinder have a certain uniform stroke conforming to the dimensional requirements of the set of gears operated thereby. Since the dimensional and operational requirements of each set of gears in each transmission unit and a corresponding set of gears in another transmission unit vary, it has heretofore been necessary to provide a multi-cylinder fluid motor in which the stroke of the power piston of each multi-position power cylinder is specifically designed for that set of gears in the transmission unit that the particular power piston will operate. Thus each multi-position power cylinder of each multi-cylinder fluid motor has required specific dimensions and components of corresponding dimensions with the result that the number of different components of the multi-cylinder fluid motors required by a manufacturer of transmission units is a certain multiple of the number of different transmission units and the number of sets of gears in these units.

Accordingly, it is the principal object of this invention to provide a multi-cylinder fluid motor comprising standard components which are adjustable to provide a wide range in the length of stroke of the actuating rod secured to the power piston of each multi-position power cylinder of the multi-cylinder fluid motor to suit the individual requirements of the gears in a number of different transmission units, with the consequent reduction to a minimum of the number of component parts of the multi-cylinder fluid motors for the entire line of transmission units.

A further object of the invention is to provide a novel and compact manually operative control valve device of simple design for controlling the operation of the above-mentioned multi-cylinder fluid motor.

According to the invention, a preferred embodiment of multi-cylinder fluid motor comprises a unitary casing embodying a pair of substantially parallel multi-position cylinders, each cylinder having operable therein a power piston to which one end of a piston rod is connected. The opposite end of each piston rod projects to the exterior of the casing and may be connected to a device to be operated, such as the gear shifting mechanism of a transmission unit. Disposed in each end of each cylinder on opposite sides of the power piston is a differential piston which serves as a stop to determine the end position to which the power piston may be moved from a central so-called Neutral position. Each differential piston comprises an adjustable telescopic portion which cooperates with a corresponding cylinder head to provide different fixed end positions for the differential piston. Suitable chambers associated with each differential piston may be charged with fluid under pressure and vented to atmosphere to actuate each differential piston selectively to one or another of two positions to determine the movement of the power piston in the direction of the respective differential piston out of the Neutral position of the power piston.

In order to selectively control the movement of the power pistons to their different operating positions, a manually operable control valve device of unusual simplicity and novel design is provided which enables an operator to readily select a desired control position for correspondingly controlling the supply of fluid under pressure to one or the other of the multi-position cylinders and the release of fluid under pressure from these cylinders to effect the operation thereof.

The manually operable control valve device comprises a casing having a bore which communicates through a plurality of ports and connecting pipes for corresponding chambers in the multi-position cylinders and a valve element which is axially shiftable and also rotatable selectively under the control of the operator into alignment with a single one of the ports at any one time to correspondingly connect that port to atmosphere while enabling the other ports to be simultaneously supplied with fluid under pressure from within the bore which is constantly charged with fluid under pressure.

In the accompanying drawings:

FIG. 2 is an elevational view, in outline, looking in the direction of the arrow A shown in FIG. 1, and showing certain structural details of the fluid motor not apparent in FIG. 1.

FIG. 3 is a vertical cross-sectional view of the fluid motor of FIG. 2, taken along the line 3—3 of FIG. 2 and looking in the direction of the arrows, showing details of the fluid motor and with the power piston of each cylinder shown in its Neutral position.

FIG. 4 is a horizontal cross-sectional view, taken along the line 4—4 of FIG. 1 and looking in the direction of the arrows, showing structural details of the manually operated control valve device.

FIG. 5 is an elevational view, in outline, looking in the direction of arrow B in FIG. 4 and showing the relative location of an operating handle and a pipe bracket face, to which all pipe connections are made, with respect to the body of the control valve device.

*Description—FIGS. 1 to 7*

Figure 1:
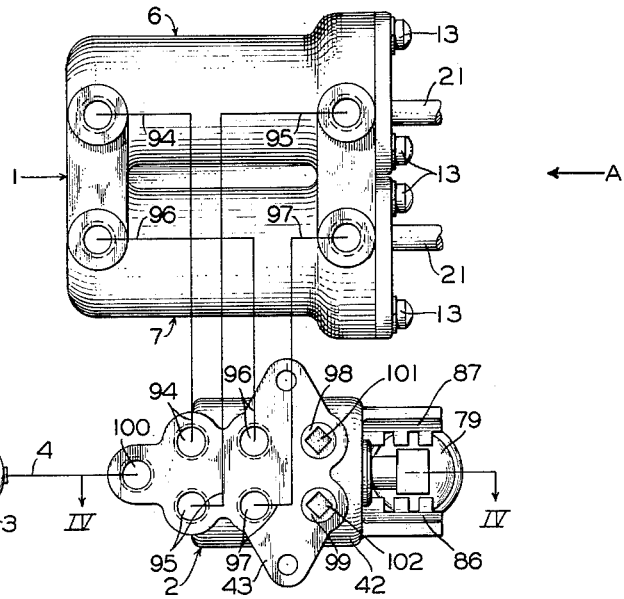
FIG. 1 is a diagrammatic plan view, in outline, of a novel six-position manually operated control valve device together with a novel fluid motor comprising two multi-position cylinders embodying the invention.

FIG. 1 of the drawings shows a multi-cylinder fluid motor 1, a manually operative control valve device 2, and a reservoir 3, charged with fluid under pressure by a fluid compressor (not shown), for supplying fluid under pressure to the control valve device 2 through a pipe 4.

As shown in FIG. 3 of the drawings, the fluid motor 1 comprises a unitary casing in which is formed two multi-position cylinders 6 and 7 arranged in side by side parallel relationship.

The multi-position cylinders 6 and 7 are generally similar. For simpilcity and convenience, only cylinder 6 will be described in detail. Corresponding parts of the other multi-position cylinder 7 will be identified by the same reference numerals without additional description.

The multi-position cylinder 6 comprises a cup-shaped body 8 which constitutes one-half of the unitary casing, it being understood that the other half of the casing constitutes a cup-shaped body 8 for the multi-position cylinder 7. The cup-shaped body 8 of the multi-position cylinder 6 has formed at one end a chamber 9 opening into a counterbore 10 in the casing. The open end of the counterbore 10 is closed by a pressure head 11 that rests against a flat surface 12 formed, as by machining, on the right-hand end of the casing 5 adjacent the open end of the counterbore 10. The pressure head 11 is secured to the unitary casing in any suitable manner, as by three cap screws 13. The pressure head 11 is generally triangular in shape and has formed on the inner face thereof a cylindrical boss 11a slightly less in diameter than the diameter of the counterbore 10 in the casing 5 into which counterbore the boss 11a extends. Disposed within a recess in the boss 11a is a gasket ring 14 the outer periphery of which contacts the wall of the counterbore 10 to provide a seal therewith in order to prevent leakage of fluid under pressure from a chamber 15 within the counterbore 10 to atmosphere.

Mounted in the counterbore 10 is a bushing 16 having a bore 17. The bushing 16 is anchored to the unitary casing by a set screw 18 screwthreaded into a threaded bore in the casing and extending into a peripheral groove 19 formed, as by machining, in the periphery of the bushing 16 midway of the ends thereof.

Slidably mounted in the bore 17 of the bushing 16 is a double-acting power piston 20 having one end of a piston rod 21 secured thereto as by means of a nut 22. The piston rod 21 projects through a bore 23 in the pressure head 11 and has its opposite end connected to a device to be operated by the multi-position cylinder 6, which device, for example, may be a gear shift actuator of a transmission unit.

Disposed respectively, on the opposite sides of the power piston 20, are two oppositely arranged hollow differential pistons 24 and 25. As seen in FIG. 3, the differential piston 24 is disposed on the left-hand side of the power piston 20 and comprises a larger piston 26 slidably mounted in the counterbore 10 in the unitary casing and a smaller piston 27 slidably mounted in the bore 17 in the bushing 16. The differential piston 25 is disposed on the right-hand side of the power piston 20 and comprises a larger piston 28 also slidably mounted in the counterbore 10 and a smaller piston 29 likewise slidably mounted in the bore 17.

Each of the hollow differential pistons 24 and 25 has an internal screw thread extending therethrough. An externally threaded hollow sleeve 30 is screw threaded into the left-hand end of the screw thread extending through the differential piston 24 and may be locked in any adjusted position by a hollow externally threaded lock nut 31. Likewise, an externally threaded hollow sleeve 32 is screw threaded into the right-hand end of the screw thread extending through the differential piston 25 and may be locked in any adjusted position by a hollow externally threaded lock nut 33.

The sleeves 30 and 32 are provided respectively with end collars 34 and 35. These collars are each provided with a plurality of arcuately spaced slots 36 for receiving the end of a spanner wrench by means of which the sleeves 30 and 32 may be rotated respectively with respect to the differential pistons 24 and 25.

The hollow lock nuts 31 and 33 are each provided respectively with a plurality of internal arcuately spaced slots 37 for receiving the ends of a spanner or pin wrench by means of which the hollow lock nuts 31 and 33 may be rotated respectively with respect to the differential pistons 24 and 25.

From the above, it is apparent that the length of stroke of each of the differential pistons 24 and 25 within the counterbore 10 can be varied as desired accordingly as each of the sleeves 30 and 32 are screw threaded into or out of the respective threaded bore in the differential pistons 24 and 25 and then locked in their adjusted position by the respective lock nuts 31 and 33. In other words, the sleeve and lock nut may be adjusted with respect to the differential piston until the larger piston of the differential piston contacts one end of the bushing 16 and the collar on the sleeve contacts such as a plurality of arcuately spaced stops 11b formed on the boss 11a on the inner face of the pressure head 11 so that the length of stroke of the differential piston is zero and the differential piston is locked against reciprocatory movement within the counterbore 10, as the differential piston 25 is shown in FIG. 3, or the sleeve and lock nut may be so adjusted with respect to the differential piston that the length of stroke of the differential piston is a maximum, which maximum length of stroke, for example, of the differential piston 25, is equal to the distance from the right-hand face of the large piston 28 to the stop 11b on the boss 11a formed on pressure head 11.

In order to prevent leakage of fluid under pressure past the larger pistons 26 and 28, the smaller pistons 27 and 29, and the power piston 20, each of these pistons is provided with a resilient gasket ring 38 having sealing and sliding contact with the wall of the respective bore in which it operates.

Leakage from the chamber 15 along the piston rod 21, which extends through the bore 23 in the pressure head 11 to the exterior thereof, is prevented by a first resilient gasket ring 39 disposed in surrounding relation to piston rod 21 and within an annular groove in the pressure head 11. A second resilient gasket ring 40 is disposed in surrounding relation to the reduced portion of the piston rod 21 and within an annular groove formed in the power piston 20 and serves to prevent leakage from the chamber 9 along the reduced portion of the piston rod 21 to the chamber 15 and vice versa.

Since the resilient gasket rings 38 carried by the larger and smaller pistons of each differential piston form a seal respectively with the counterbore 10 in the unitary casing and bore 17 in bushing 16, the unitary casing, adjacent each end of the bushing 16, is provided with a vent passageway 41 opening to atmosphere to prevent dash pot action as each differential piston moves in the direction of the respective adjacent end of the bushing 16.

It should be pointed out that by this invention any uniform stroke two-position cylinder can be converted into a variable stroke three-position cylinder as follows:

First, remove the pressure head and piston from the cylinder. Next, by means of such as a drill, provide the cylinder with the vent passageways 41. Thereafter, by means of such as the drill and a tap, a threaded hole may be provided in the cylinder for receiving a set screw such as the set screw 18. Subsequent to so modifying the cylinder, a bushing, such as the bushing 16, a power piston, such as the power piston 20, to which has been secured a piston rod the diameter of which is the same as the diameter of the piston rod secured to the piston that has been removed, and two differential pistons, such as the differential pistons 24 and 25, may be assembled, as shown in FIG. 3, and then pushed into the bore in the cylinder, it being understood that the outside diameter of the bushing and the diameter of the larger piston of each differential piston are respectively substantially the same as the diameter of the bore in the cylinder in which these elements are placed.

After the bushing is properly positioned in the cylinder, it is anchored therein by suitable means, such as a screw 18 screw threaded into the threaded hole in the cylinder.

Following anchoring of the bushing in the cylinder, the pressure head is then slipped onto the piston rod of the power piston and, when moved to a position abutting the end of the cylinder, secured thereto by the means formerly used for this purpose.

The operation of the converted cylinder will be the same as that of the multi-position cylinder 6 which operation will be hereinafter described in detail.

The manually operative control valve device 2 comprises a generally cylindrical casing 42 having formed integral therewith a pipe bracket 43. The casing 42 has a bore 44 and two coaxial and concentric counterbores 45 and 46. A generally rectangularly shaped valve element 47 mounted in the counterbore 45 has a first shaft 48 extending from its left-hand face and a second coaxially aligned shaft 49 constituting a rotary valve stem extending from its right-hand face. The first shaft 48 is slidably and rotatably mounted in the bore 44 in the casing 42 and the second shaft 49 is slidably and rotatably mounted in a bore 50 in a cup-shaped bonnet or end cover 51. The inner end of the cover is of a diameter to fit in the counterbore 45 while the outer periphery of the end cover is of a diameter to fit snugly in the counterbore 46. End cover 51 is held in place against a shoulder 52 formed at the end of the larger counterbore 46, as by a snap ring 53 inserted into a groove 54 formed in the casing 42.

In order that the left-hand face of the valve element 47 may be moved into contact with a wall 53 at the left-hand end of the counterbore 45, this circular end of the counterbore 45 is enlarged by means of a boring tool to form a groove indicated in FIG. 4 by the reference numeral 55.

For normally biasing the valve element 47 to the position in which it is shown in FIG. 4, a caged spring 56 is interposed between the right-hand face of the valve element 47 and the end of a counterbore 57 formed in the cover 51.

To facilitate assembly, prior to placing the cover 51 within the counterbores 45 and 46, the spring 56 is assembled within a spring cage 58. The spring cage 58 comprises a spring seat 59 and a spring retainer 60. The spring seat 59 comprises a hollow sleeve concentrically surrounding the shaft 49 and having an inturned flange 61 at one end and an outturned flange 62 at the other end. When the valve element 47 occupies the position in which it is shown in FIG. 4, the inturned flange 61 rests against a snap ring 63 which is inserted in a groove formed in the shaft 49, and the outturned flange 62 rests against the bottom of the counterbore 57. The spring retainer 60 comprises a hollow sleeve having an inturned flange 64 at one end. The inside diameter of the flange 64 on this sleeve is greater than the outside diameter of the outturned flange 62 on spring seat 59. An outturned flange 65 formed at the opposite end of spring retainer 60 has a diameter which is less than the diameter of the counterbore 57 in cover 51. The opposite ends of the spring 56 rest respectively against the inturned flange 64 at the left-hand end of the spring retainer 60 and the outturned flange 62 at the right-hand end of the spring seat 59. The inside diameter of the sleeve portion of spring retainer 60 is greater than the diameter of the outturned flange 62 so that the outturned flange 65 can be moved into contact with the bottom of the counterbore 57 against the biasing force of the spring 56 when the valve element 47 is slid within the counterbore 45 in the direction of the right-hand from the position in which it is shown in FIG. 4.

The spring 56 is assembled within its spring cage 58 by first placing the spring retainer 60 in concentric surrounding relation to the shaft 49 so that the inturned flange 64 thereon is in abutting relation with the right-hand face of the valve element 47. The spring 56 is then placed within the spring retainer 60 in concentric surrounding relation to the shaft 49 with one end of the spring 56 resting against the inturned flange 64 on the spring retainer 60. The spring seat 59 is then placed within the spring 56 and in concentric surrounding relation to the shaft 49 so that the outturned flange 62 thereon rests against the end of the spring 56 opposite the end that rests against the inturned flange 64. A force is now applied to the spring seat 59 by any suitable means to compress the spring 56 and move the spring seat 59 toward the inturned flange 64 until the retaining snap ring 63 can be inserted in the groove formed in the shaft 49 for receiving it. Upon removal of force from the spring seat 59, the spring 56 will be retained in its spring cage 58 interposed between the inturned flange 64 and the outturned flange 62.

Subsequent to assembling the spring 56 within the spring cage 58, as just described, the outer end of the shaft 49 is pushed through the bore 50 in the cover 51 until the outturned flange 62 on the spring seat 59 rests against the bottom of the counterbore 57 in the cover. The cover 51 will now be in a position in which a snap ring 66 can be placed in concentric surrounding relation to the spring retainer 60 and inserted in a groove formed in the counterbore 57 in the cover 51.

Following the assembling of the spring 56 and spring cage 58 to the shaft 49 and prior to placing the valve element 47 within the bore 45 in the casing 42, a spring 67 is placed in a cylindrical recess 68 formed in the valve element 47 in concentric surrounding relation to an inner spring guide 69 and between this inner spring guide and an outer spring guide 70 each of which is formed integral with the valve element 47.

Extending through the inner spring guide 69 is a bore 71 the axis of which intersects at a right angle the axis of a bore 72 extending inward from the left-hand end of the shaft 48. Therefore, after the spring 67 is placed in the cylindrical recess 68, a hollow stem 73 extending from one side of a cylindrical slide valve 74 is inserted into the bore 71. The cylindrical slide valve 74 is provided with a peripheral annular groove in which is carried a first resilient gasket ring 75 to prevent leakage of fluid under pressure from the counterbore 45 into the hollow stem 73. A second resilient gasket ring 76 disposed in an annular groove formed in the wall of the bore 71 in the inner spring guide 69 concentrically surrounds the hollow stem 73 to form a seal therewith and prevent leakage of fluid under pressure from the bore 45 into the bore 71 and thence to atmosphere through the bore 72.

After an assembly comprising the valve element 47, the spring 56 and the caging means provided therefor, the cover 51, the spring 67, and the cylindrical slide valve 74, have been assembled, as described above, the end of the assembly constituted by the shaft 48 is introduced into the open end of the counterbore 46 in the casing 42 of the manually operative control valve device 2 and positioned such that, as the assembly is moved in the direction of the left hand, the shaft 48 and the cover 51 may be pushed respectively into the bore 44 and the counterbore 46, it being understood that the cylindrical slide valve 74 is moved against the yielding resistance of the spring 67 to a position such that the cylindrical slide valve 74 may be inserted into the counterbore 45. The assembly is thus moved in the direction of the left hand until it occupies the position shown in FIG. 4. After the assembly is moved to the position shown in FIG. 4, the snap ring 53 is inserted in the groove 54 formed in the casing 42 to anchor the cover 51 between the shoulder 52 and the snap ring 53.

In order to prevent leakage of fluid under pressure from within the counterbore 45 to atmosphere, the cover 51 is provided with two resilient gasket rings 77 having sealing contact respectively, with the wall of the counterbore 45 and the periphery of the shaft 49. A resilient gasket ring 78, similar to the rings 77, is disposed in an annular groove formed in the casing 42 and in surrounding sealing relation to the periphery of the shaft 48 to also prevent leakage of fluid under pressure from within the bore 45 along the shaft 48 to atmosphere.

The outer end of the shaft 49 constituting the rotary valve stem for the valve element 47 has a portion of reduced diameter for receiving one end of an operating handle 79 which has intermediate its ends a portion 80 of cruciform shape in cross section having four arms 81, 82, 83, and 84 (FIG. 7) at right angles and of equal length. The one end of the handle 79 is provided with a bore for receiving the reduced end portion of the shaft 49 and the handle is secured thereto by a pin 85 (FIG. 5).

Figure 7:
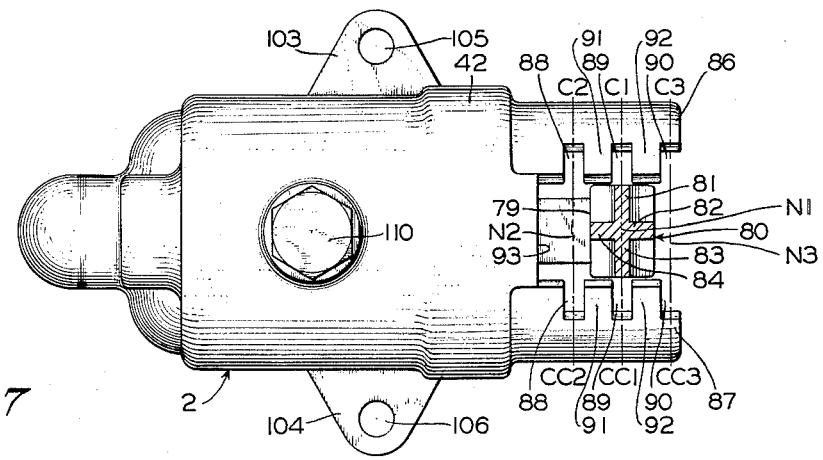
FIG. 7 is a plan view, mainly in outline, looking in the direction of the arrow C in FIG. 4 and showing certain structural details of an operating handle and guide means therefor of the novel control valve device not apparent in FIGS. 4, 5 and 6.

Formed integral with the casing 42 and extending therefrom on opposite sides of the handle 79 and spaced-apart parallel relation, as shown in FIGS. 5 and 7, are two generally alike handle guide members 86 and 87.

Provided in each of the guide members 86 and 87, as by machining, are three spaced-apart parallel slots 88, 89 and 90 (FIG. 7). The width of each slot in each guide member is slightly in excess of the width of each arm of the cruciform portion 80 of the operating handle 79 to provide a sliding fit therebetween.

The three slots in each guide member cooperate to form on the respective guide member two spaced-apart parallel fingers 91 and 92 projecting in the direction opposite the direction of projection of the corresponding fingers on the other guide member and spaced therefrom a distance sufficiently greater than the total length of the two coaxial arms 81 and 83 on the cruciform portion 80 of the handle 79 to form a longitudinal path through which the handle may be moved between the two guide members 86 and 87. Furthermore, the slot 88 in each guide member is spaced from a wall 93 formed on the control valve casing 42 and in alignment with the right-hand end of the cover 51 a distance substantially equal to the length of the arm 84 on the cruciform portion 80 of the handle 79. Each slot in each pair of corresponding slots in the guide members 86 and 87 thus forms an opening for receiving one or the other of the arms 81 and 83 on the cruciform portion 80 of the handle 79 accordingly as the handle is rocked clockwise or counterclockwise, as viewed in FIG. 5, to one or the other of its two extreme positions.

From the above it is apparent that in order to rock the handle 79 clockwise to a position in which the arm 81 on the cruciform portion 80 of the handle will be received in either the slot 88 or slot 90 in the guide member 86, the handle 79 must be first moved in its longitudinal path in one direction or in an opposite direction against the yielding resistance of the caged spring 56 to a position in this longitudinal path in which the arm 81 of the cruciform portion 80 will be received in either the slot 88 or the slot 90 in the guide member 86 when the handle 79 is rocked clockwise, as viewed in FIG. 5. It is also apparent that in order to rock the handle 79 counterclockwise to a position in which the arm 83 on the cruciform portion 80 of the handle will be received in either the slot 88 or slot 90 in the guide member 87, the handle 79 must be first moved in its longitudinal path in one direction or in an opposite direction against the yielding resistance of the caged spring 56 to a position in this longitudinal path in which the arm 83 of the cruciform portion 80 will be received in either the slot 88 or the slot 90 in the guide member 87 when the handle is rocked counterclockwise, as viewed in FIG. 5.

Since the handle 79 is connected to the rotary valve stem 49 by the pin 85, rocking of the handle 79 in either direction effects rotation of the valve element 47 and consequently the cylindrical slide valve 74 within the counterbore 45.

Extending from the face of the pipe bracket 43 through the bracket and the control valve casing 42 and opening at the surface of the counterbore 45 in the casing 42 are six ports and passageways 94, 95, 96, 97, 98 and 99. A supply port and passageway 100 extends from the face of the pipe bracket 43 through the bracket and the control valve casing 42 and opens at the surface of the bottom of the counterbore 45 so that fluid under pressure is constantly supplied to the interior of the counterbore 45. The ports and passageways 94 and 95 are connected respectively by pipes bearing the same numerals to the chambers 9 and 15 in the multi-position cylinder 6. The ports and passageways 96 and 97 are connected respectively by pipes bearing the same numerals to the chambers 9 and 15 in the cylinder 7. The pipe bracket end of each of the passageways 98 and 99 is closed as by a threaded plug 101 and 102, respectively. It should be understood that the manually operative control valve device 2 is adapted to control a third multi-position cylinder, such as the cylinder 6 or 7, by removing the plugs 101 and 102 and connecting the passageways 98 and 99 by pipes to the chambers in this third multi-position cylinder corresponding to the chambers 9 and 15 in the cylinders 6 and 7. The supply port and passageway 100 is connected by the pipe 4 to the reservoir 3.

The valve element 47 and the cylindrical slide valve 74 can be rotated within bore 45 by rocking the operating handle 79 from one or another of three spaced-apart Neutral Positions N1, N2 and N3, which three Neutral Positions are in the above-mentioned longitudinal path. In each of these three Neutral Positions fluid under pressure is supplied from the reservoir 3 through pipe 4 and passageway 100 to all of the other ports and passageways in the control valve casing 43 and thence through the corresponding pipes to all of the chambers 9 and 15 in the multi-position cylinders 6 and 7. The operating handle 79 can be rocked clockwise from each of its three Neutral Positions to a corresponding one of three clockwise positions C1, C2 and C3 or the handle can be rocked counterclockwise to a corresponding one of three counterclockwise positions CC1, CC2 and CC3, as indicated in FIG. 7 by the legends C1, C2, C3, CC1, CC2 and CC3. Thus rocking the handle 79 to these different positions controls the supply of fluid under pressure from the reservoir 3 through pipe 4 and certain ports and passageways in the control valve casing 42 and pipe bracket 43 and corresponding pipes to certain of the chambers 9 and 15 in the multi-position cylinders 6 and 7, and also the release of fluid under pressure from one of the chambers in these multi-position cylinders to atmosphere to control the operation of the power piston of this one of the multi-position cylinders whereby the piston rod connected to this power piston may be shifted from a corresponding Neutral Position to a corresponding Control Position, respectively.

To enable the generally cylindrical casing 42 to be secured or anchored to some member, such as a bracket located in the driver's cab of a heavy duty truck, the pipe bracket 43, which is integral with the casing 42, is provided with two oppositely extending feet 103 and 104 (FIG. 6) through which extend two corresponding bores 105 and 106 for receiving bolts (not shown) by which the pipe bracket 43 may be attached to the bracket in the driver's cab.

A detent in the form of a spring-biased ball or detent 107 is provided for engaging three peripherally spaced notches 108 formed on the upper end of valve element 47, the three notches corresponding in number to the three radial positions the operating handle 79 may occupy. The spring-biased ball 107 serves to hold the valve element 47 and the cylindrical slide valve 74 carried thereby against movement from any position to which they are moved by the handle 79. The ball 107 is slidably mounted in a counterbore 109 provided in a threaded plug 110 screwed into a screw threaded bore 111 in a boss 112 formed integral with the casing 42. The ball 107 is biased into one or another of the three notches 108 by a spring 113 disposed within the counterbore 109 between the ball and the bottom of the counterbore.

In order to prevent leakage of fluid under pressure from within the bore 45 along the screw threaded bore 111 to atmosphere, the plug 110 has an undercut portion for receiving a resilient gasket ring 114 having sealing contact respectively with the periphery of the undercut portion of the plug 110 and the wall of a counterbore 115 formed in the boss 112 concentric with the screw threaded bore 111 therein.

*Operation—FIG. 1*

Figure 6:
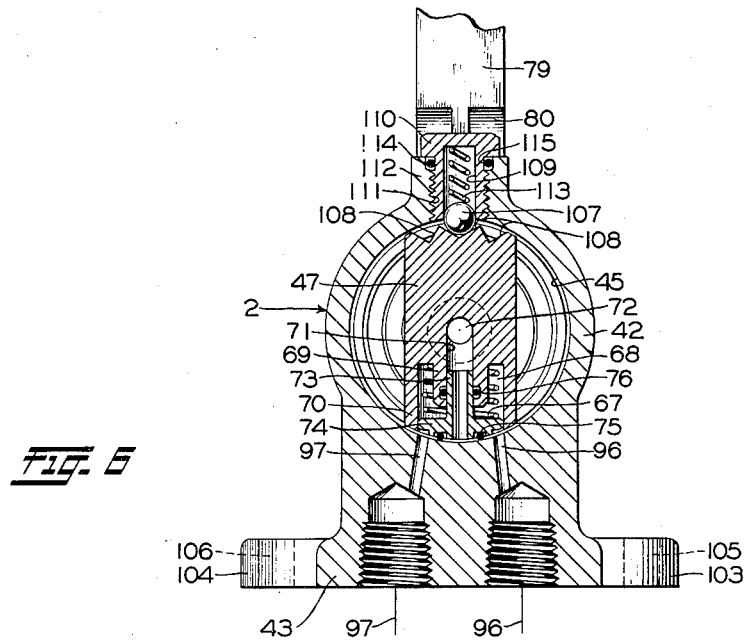
FIG. 6 is a cross-sectional view, taken along the line 6—6 of FIG. 4, looking in the direction of the arrows, and showing details of a valve element and a casing of the manually operated control valve device.

In operation, let it be assumed that the reservoir 4 is charged with fluid to some chosen pressure, such as one hundred pounds per square inch. Further, assume that the handle 79 and the valve element 47 of the manually operative control valve device 2 occupy their First Neutral Position N1 in which they are shown in FIGS. 4, 6 and 7. While in its First Neutral Position N1, as shown in FIGS. 4, 6 and 7, the handle 79 is disposed in a position midway the length of its longitudinal path. As long as the handle 79 is in its First Neutral Position N1, the valve element 47 and cylindrical slide valve 74 will occupy the position in which they are shown in FIGS. 4 and 6. When the cylindrical slide valve 74 occupies the position in which it is shown in FIGS. 4 and 6, it is out of alignment with all of the ports 94, 95, 96 and 97 opening at the surface of the counterbore 45 in the casing 42. Consequently, fluid under pressure supplied from the reservoir 3 through pipe 4 and supply passageway and port 100 to the interior of the counterbore 45 will flow therefrom through each and all of the ports and passageways 94, 95, 96 and 97 and corresponding pipes to the chambers 9 and 15 in the multi-position cylinders 6 and 7.

The fluid under pressure thus supplied to the chamber 9 in the multi-position cylinder 6 through the port and passageway 94 and corresponding pipe will act on the effective area of the larger piston 26 of the differential piston 24 and also flow through the hollow sleeve 30 to act on the effective area of the smaller piston 27 of the differential piston 24 and on the entire area of the left-hand face of the power piston 20. The diameters of the pistons 26 and 27 are such that the effective area of the larger piston 26 is greater than the effective area of the smaller piston 27. Accordingly, the fluid under pressure acting on the larger piston 26 moves the differential piston 24 of the multi-position cylinder 6 from the position in which it is shown in FIG. 3 in the direction of the right hand until the larger piston 26 contacts the left-hand end of the bushing 16. The length of the differential piston 24 is such that the smaller piston 27 thereof will be moved into contact with the left-hand face of the power piston 20 when the power piston is in the position shown in FIG. 3 simultaneously as the larger piston 26 thereof moves into contact with the left-hand end of the bushing 16.

The fluid under pressure acting on the left-hand face of the power piston 20 is ineffective to move the power piston 20 from the position in which it is shown in FIG. 3 since the right-hand face of the power piston 20 is in abutting relation with the smaller piston 29 of the differential piston 25 and the collar 35 on the right-hand end of the hollow sleeve 32 carried by the differential piston 25 is in abutting relation with the stops 11b.

The fluid under pressure supplied to the chamber 15 in the multi-position cylinder 6 through the port and passageway 95 and corresponding pipe will flow through the hollow sleeve 32 and differential piston 25 to the right-hand face of the power piston 20. Since fluid acting on the left-hand face of the power piston 20 is at the same pressure as that supplied to the right-hand face and the area of the right-hand face is less than the area of the left-hand face by an amount equal to the cross-sectional area of the piston rod 21, the fluid under pressure supplied to the chambers 9 and 15 in the multi-position cylinder 6 is ineffective to move the power piston 20 of the multi-position cylinder 6 from its Neutral Position in which it is shown in FIG. 3.

The fluid under pressure supplied to the chamber 9 in the multi-position cylinder 7 through the port and passageway 96 and corresponding pipe is effective to move the differential piston 24 within this multi-position cylinder from the position in which it is shown in FIG. 3 in the direction of the right hand to a position in which the larger piston 26 of this differential piston contacts the left-hand end of the bushing 16 in the same manner as hereinbefore explained for the differential piston 24 within the multi-position cylinder 6.

The fluid under pressure supplied to the chamber 15 in the multi-position cylinder 7 through the port and passageway 97 and corresponding pipe will act on the effective area of the larger piston 28 of the differential piston 25 and also flow through the hollow sleeve 32 to act on the effective area of the smaller piston 29 of the differential piston 25 and on the effective area of the right-hand face of the power piston 20. For the reason hereinbefore explained for the differential piston 24, the differential piston 25 within the multi-position cylinder 7 will now move in the direction of the left hand until the larger piston 28 thereof contacts the right-hand end of the bushing 16.

When the larger pistons 26 and 28 of the respective differential pistons 24 and 25 thus contact the corresponding ends of the bushing 16, the respective smaller pistons 27 and 29 of these differential pistons are spaced from each other a distance equal to the thickness of the power piston 20 and thus force the power piston 20 into its Neutral Position in which it is shown in FIG. 3, if it is not already in such position. Consequently, the power piston 20 is moved to its Neutral Position, in which it is shown in FIG. 3, by the pressure of fluid supplied simultaneously to the chambers 9 and 15 in the multi-position cylinder 7.

With the handle 79 and the valve element 47 of the manually operative control valve device 2 occupying their First Neutral Position N1, as hereinbefore explained, the operator may cause movement of the power piston 20 of the multi-position cylinder 7 in the direction of the right hand from the position in which it is shown in FIG. 3, simply by rocking the operating handle 79 in a counterclockwise direction, as viewed in FIG. 5, to its counterclockwise Position CC1 in which position the arm 83 on the cruciform portion 80 of the handle contacts the end of the slot 89 in the handle guide member 87 (FIG. 7). In rocking the handle 79 as just described, the valve element 47 and cylindrical slide valve 74 are rotated within the counterbore 45 from the position in which they are shown in FIG. 6 to a position in which the resilient gasket ring 75 carried by the cylindrical slide valve 74 concentrically surrounds the port 97 opening at the surface of the counterbore 45. With the cylindrical slide valve 74 now in this position, the port and passageway 97 and the pipe bearing the same numeral are connected to atmosphere through the hollow stem 73 of the cylindrical slide valve 74, and the bores 71 nad 72 in the valve element 47, thus venting the chamber 15 in the multi-position cylinder 7 while all of the other pipes, passageways and corresponding ports opening at the surface of the counterbore 45 remain charged with fluid under pressure from the reservoir 3, as previously explained.

As fluid under pressure is thus vented from the chamber 15 in the multi-position cylinder 7, as just explained, the fluid under pressure supplied to the chamber 9 in this multi-position cylinder moves the power piston 20, the piston rod 21 connected thereto, and the differential piston 25 within this cylinder in the direction of the right hand until the collar 35 on the sleeve 32 carried by the differential piston 25 contacts the stops 11b on the boss 11a of the pressure head 11 or, in other words, until the differential piston 25 reaches the position in which it is shown in FIG. 3. As the power piston 20 is thus moved from the position in which it is shown in FIG. 3 to the position in which the right-hand face thereof contacts the smaller piston 29 of the differential piston 25 while this differential piston occupies the position in which it is shown in FIG. 3, the piston rod 21 will be shifted from one position, such as a Neutral Position N, to a Second Position, such at P1.

Let it now be assumed that the operator rocks the handle 79 in a clockwise direction, as viewed in FIG. 5, from its counterclockwise Position CC1 back to its First Neutral Position N1. As the handle 79 is thus rocked back to its First Neutral Position N1, the valve element 47 and cylindrical slide valve 74 are rotated within the counterbore 45 back to the position in which they are shown in FIG. 6 in which position the cylindrical slide valve 74 and the resilient gasket ring 75 carried thereby are disposed between the ports 96 and 97. Consequently, fluid under pressure will be again supplied through port and passageway 97 and the pipe bearing the same numeral to the previously vented chamber 15 in the multi-position cylinder 7, it being understood that all of the other ports, passageways and pipes remain charged with fluid under pressure as previously explained.

Upon the resupply of fluid under pressure to the chamber 15 in the multi-position cylinder 7, this fluid under pressure acts on both ends of the differential piston 25 and on the right-hand face of the power piston 20. Since the effective area of the larger piston 28 of the differential piston 25 exceeds the effective area of the smaller piston 29 of this differential piston by more than the area of the piston rod 21, the fluid under pressure resupplied to the chamber 15 moves the differential piston 25 and the power piston 20 in the direction of the left hand against the force of fluid under pressure acting on the left-hand face of the power piston 20 until the larger piston 28 of the differential piston 25 contacts the right-hand end of bushing 16. As the power piston 20 is thus returned to the position in which it is shown in FIG. 3, the piston rod 21 connected thereto will be shifted from its above-mentioned Position P1 back to its Neutral Position N.

Let it now be assumed that the operator desires to move the power piston 20 and the piston rod 21 of the multi-position cylinder 7 in the direction of the left hand, as viewed in FIG. 3, to shift the piston rod 21 from its Neutral Position N, to a third position, such as Position P2. To do so, the operator will rock the handle 79 in a clockwise direction, as viewed in FIG. 5, from its First Neutral Position N1 to its clockwise Position C1 in which position the arm 81 on the cruciform portion 80 of the handle contacts the end of the slot 89 in the handle guide member 86 (FIG. 7). In rocking the handle 79 from its First Neutral Position N1, in which position it is shown in FIGS. 4, 5 and 6 to its clockwise Position C1, the valve element 47 and cylindrical slide valve 74 are rotated within the counterbore 45 from the position in which they are shown in FIG. 6 to a position in which the resilient gasket ring 75 carried by the cylindrical slide valve 74 concentrically surrounds the port 96 opening at the surface of the counterbore 45. With the cylindrical slide valve 74 now in this position, the port and passageway 96 and the pipe bearing the same numeral are connected to atmosphere through the hollow stem 73 of the cylindrical slide valve 74 and the bores 71 and 72 in the valve element 47, thus venting the chamber 9 in the multi-position cylinder 7 while all of the other pipes, passageways and corresponding ports opening at the surface of the bore 45 remain charged with fluid under pressure from the reservoir 3.

As fluid under pressure is thus vented from the chamber 9 in the multi-position cylinder 7, as just explained, the fluid under pressure supplied to the chamber 15 in this multi-position cylinder moves the power piston 20, the piston rod 21 connected thereto and the differential piston 24 within this cylinder in the direction of the left hand until the collar 34 on the left-hand end of the sleeve 30 carried by the differential piston 24 contacts a stop 116 formed integral with the casing 5. As the power piston 20 is thus moved from the position in which it is shown in FIG. 3 to the position in which the lefthand face thereof contacts the smaller piston 27 of the differential piston 24 when this differential piston occupies the position in which it is shown in FIG. 3, the piston rod 21 connected at one end to the power piston 20 will be shifted from its above-mentioned Neutral Position N to its position identified as P2 in FIG. 3.

Now let it be supposed that the operator desires to effect operation of a device connected to the exterior end of piston rod 21 of the multi-position cylinder 6. To do so, he must first rock the handle 79 from its clockwise Position C1 back to its First Neutral Position N1. As the handle 79 is thus rocked back to its First Neutral Position N1, the valve element 47 and cylindrical slide valve 74 are rotated within the counterbore 45 back to the position in which they are shown in FIG. 6 in which position fluid under pressure will be supplied through all of the ports opening at the surface of the counterbore 45. Consequently, the power piston 20 of the multi-position cylinder 7 will be returned to the position in which it is shown in FIG. 3 and the piston rod 21 will be shifted from its Position P2 back to its hereinbefore mentioned Neutral Position N.

As hereinbefore explained, when the operating handle 79 has been rocked back to its First Neutral Position N1, it will also be in a position to be moved in its longitudinal path. Hence, in order to effect positioning of piston rod 21 of the multi-position cylinder 6, the operator will now move the handle 79 in its longitudinal path in the direction of the left hand, as viewed in FIG. 7, and consequently the valve element 47 and cylindrical slide valve 74 in the same direction within the counterbore 45 against the yielding resistance of the caged spring 56, to a second Neutral Position N2 in which the arms 81 and 83 of the cruciform portion 80 of the handle 79 can be received respectively in the slot 88 in the guide member 86 or in the slot 88 in the guide member 87 accordingly as the handle 79 is rocked clockwise, as viewed in FIG. 5, to its clockwise Position C2 or counterclockwise to its counterclockwise Position CC2.

Let it now be supposed that the operator, without releasing his grip on the handle 79, rocks the handle 79 counterclockwise from its second Neutral Position N2 to its counterclockwise Position CC2 in which position the arm 83 on the cruciform portion 80 of the handle contacts the end of the slot 88 in the handle guide member 87 (FIG. 7). In rocking the handle 79 to its counterclockwise Position CC2, the valve element 47 and cylindrical slide valve 74 are correspondingly rotated within the counterbore 45 to a position in which the resilient gasket ring 75 carried by the cylindrical slide valve 74 concentrically surrounds the port 95 opening at the surface of the bore 45. Consequently, the port, passageway and pipe 95 and chamber 15 in the multi-position cylinder 6 will now be vented to atmosphere. Nevertheless, the fluid under pressure present in the chamber 9 in this cylinder will not effect movement of the power piston 20 and differential piston 25 from the position in which they are shown in FIG. 3 since the collar 35 on the hollow sleeve 32 carried by the differential piston 25 is in abutting contact with the stops 11b on the boss 11a of pressure head 11.

However, if previously the hollow lock nut 33 had been rotated by means of a spanner or pin wrench within the threaded bore in the hollow sleeve 32 so as to move the lock nut 33 in the direction of the left hand with respect to the sleeve 32 a chosen distance, and then the sleeve 32 rotated by means of a spanner wrench so as to be moved in the same direction until the left-hand end of the sleeve was in abutting contact with the right-hand side of the lock nut 33, the power piston 20 and the differential piston 25 in the multi-position cylinder 6 would be moved at this time in the direction of the right hand this chosen distance by the fluid under pressure present in the chamber 9. Accordingly, it is evident that by adjusting the lock nut 33 and hollow sleeve 32 with respect to the differential piston 25 to provide this differential piston with the proper length of stroke, the power piston 20 of the multi-position cylinder 6, will likewise be provided with the proper length of stroke to shift the piston rod 21 connected to this power piston from its one position, such as a Neutral Position N, to a second position, such as Position P1.

The operator may now either rock the handle 79 from its counterclockwise Position CC2 back to its Second Neutral Position N2, or by continuing to rock the handle subsequent to its reaching its Second Neutral Position N2, he may rock the handle to its clockwise Position C2 in which the arm 81 on the cruciform portion 80 of the handle contacts the end of the slot 88 in the handle guide member 86 (FIG. 7).

If the operator only rocks the handle 79 back to its Second Neutral Position N2, the valve element 47 and cylindrical slide valve 79 will be moved to a position in which fluid under pressure will be supplied to all of the ports opening at the surface of the wall of the counterbore 45. Therefore, fluid under pressure will be resupplied to the chamber 15 in the multi-position cylinder 6. Since the chamber 9 in this cylinder is also supplied with fluid under pressure at this time, the fluid under pressure present in the chambers 9 and 15 will move the differential pistons 24 and 25 in opposite directions until the respective larger pistons 26 and 28 of these differential pistons contact respectively the left and right-hand ends of the bushing 16. As the differential pistons 24 and 25 thus move in opposite directions, they move the power piston 20 and its rod 21 to the Neutral Position N.

Now let it be supposed that the operator rocks the handle 79 from its Second Neutral Position N2 to its clockwise Position C2 in which position the arm 81 on the cruciform portion 80 of the handle contacts the end of the slot 88 in the handle guide member 86 (FIG. 7). As the handle 79 is rocked to its clockwise Position C2, it rotates the valve element 47 and cylindrical slide valve 74 within the counterbore 45 to a position in which the resilient gasket ring 75 carried by the cylindrical slide valve concentrically surrounds the port 94 opening at the surface of the counterbore 45. Hence, the chamber 9 in the multi-position cylinder 6 will now be vented to atmosphere through pipe, pasageway and port 94, hollow stem 73 of cylindrical slide valve 73, and bores 71 and 72 in valve element 47.

In response to the venting fluid under pressure from the chamber 9 in the multi-position cylinder 6, the fluid under pressure supplied to the chamber 15 in this cylinder through port, passageway, and pipe 95 moves the power piston 20, and also the differential piston 25 if it is not already in the position shown in FIG. 3, in the direction of the left hand. As the power piston 20 is thus moved in the direction of the left hand, it will push the differential piston 24 in the same direction until the collar 34 on the left-hand end of the sleeve 30 carried by this differential piston contacts a stop 117 formed integral with the casing 5, it being understood that the power piston 20 moves away from the smaller piston 29 of the differential piston 25 subsequent to the larger piston 28 of this differential piston contacting the right-hand end of the bushing 16. This movement of the power piston 20 in the direction of the left hand shifts the piston rod 21 connected thereto from its Neutral Position N to a third Position P2.

From the above, it is apparent that an operator, by moving the operating handle 79 in its longitudinal path to one or the other of two Neutral Positions and then rocking the handle either in a clockwise or a counterclockwise direction can control the operation of one or the other of the two multi-position cylinders 6 and 7 and a device connected thereto.

It will be apparent that when the fluid motor is utilized to operate a transmission unit to its different positions, one of the positions P1 and P2 of either of the cylinders 6 or 7 may correspond to the Reverse Position of the transmission unit while the remaining positions of the cylinders 6 and 7 may correspond to different forward positions of the transmission unit.

Figure 8:
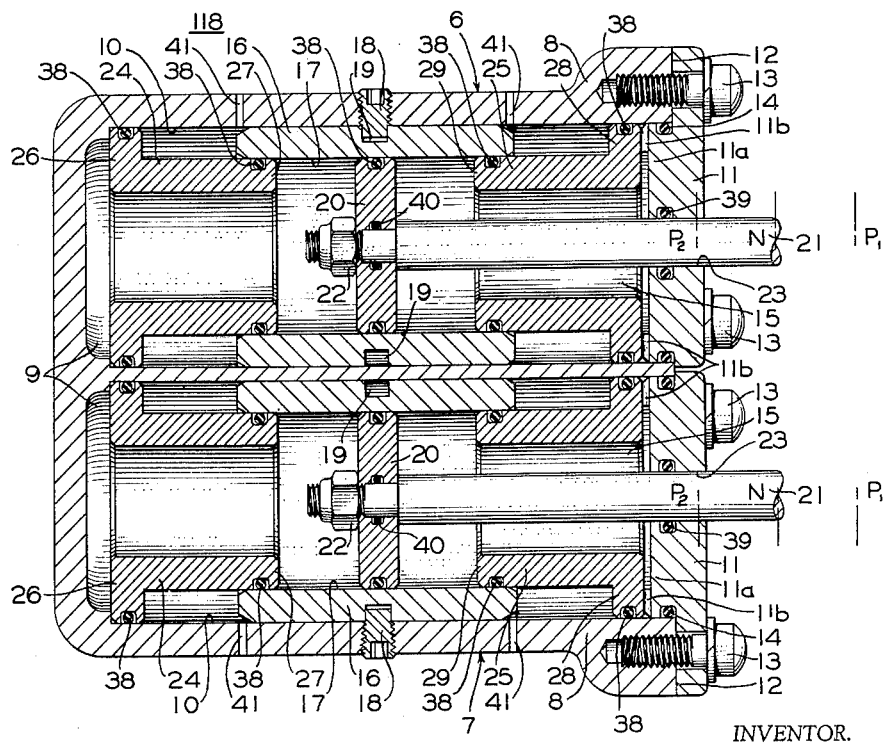
FIG. 8 is a vertical cross-sectional view, showing a second embodiment of a fluid motor similar to that of FIG. 3 but in which the differential pistons are non-adjustable.

*Description—FIG. 8*

FIG. 8 of the drawings shows a second embodiment of a fluid motor 118 comprising the invention. Fluid motor 118 is identical in construction to fluid motor 1 except the hollow differential pistons used in this fluid motor are different in form than those shown in FIG. 3.

The hollow differential pistons shown in FIG. 8 are not provided with an internal screw thread extending therethrough for receiving an externally threaded hollow sleeve and lock nut, such as the sleeves 30 and 32 and lock nuts 31 and 33 shown in FIG. 3. Accordingly, by the omission of the sleeves and lock nuts from the differential pistons shown in FIG. 8, no means are provided for varying the length of stroke of these differential pistons and thereby the location of the extreme outer positions of these differential pistons with respect to the ends of the respective bushing and the pressure heads accociated with each pair of differential pistons. Since the location of the extreme outer positions of the differential pistons determines the length of stroke of the power pistons shown in FIG. 3, it is evident that the power pistons shown in FIG. 8 have a uniform stroke.

Since the fluid motors shown in FIGS. 3 and 8 are identical in construction, except as pointed out above, for convenience, corresponding parts of the two fluid motors are identified by the same reference numerals without additional description.

The operation of the fluid motors shown in FIGS. 3 and 8 is identical, it being understood that the length of stroke of the power pistons shown in FIG. 8 cannot be varied. Since the operation of the two fluid motors is identical, a detailed description of the operation of the fluid motor shown in FIG. 8 is believed to be unnecessary.

Having now described the invention, what I claim as new and desire to secure by Letters Patent, is:

1. In combination, a fluid motor device comprising a casing having two pressure chambers, and piston means operative when subject in opposing relation to equal fluid pressures supplied to said two chambers to a central position in a bore, and shiftable upon venting of fluid pressure from only one chamber at either side thereof to a given position in axially spaced relation at one side or the other of said central position, and valve means comprising a casing having a bore, two passageways opening at the said bore, conduit means connecting said passageways respectively to said chambers, a source of fluid under pressure constantly connected to said bore from which fluid under pressure is simultaneously supplied to both said chambers, while said passageways are open to said bore, and a valve element in said bore having a port and passageway therein constantly connected to atmosphere, said valve element being shiftable in said bore to cause the port in the valve element to selectively register with only one of said two passageways at a time to thereby selectively control venting of fluid under pressure from one or the other of said chambers and thus direction of movement of said piston away from said central position.

2. A fluid motor comprising a casing having a cylindrical bore open at one end, a removable pressure head for closing said one end of the bore and providing access to the bore when the head is removed from the casing, a cylindrical liner coaxially arranged in and removably secured in said bore with at least one end thereof in spaced relation to one end of the bore of the casing, a double-acting power piston slidably operable in the bore of the liner and having a piston rod which extends slidably through the pressure head to the exterior of the casing for attachment to a device to be operated thereby a differential piston member having two annular pistons of different diameters respectively, and connected in coaxial spaced relation by tubular means, the one piston of larger diameter being slidably operable in the bore of the casing and the other piston of smaller diameter being slidably operable in the liner at the end thereof adjacent the end of the bore in the casing in which the annular piston of larger diameter operates, port means in said casing through which the annular chamber formed between said annular pistons is maintained constantly at atmospheric pressure, said differential piston member being shiftable by the differential force thereon of fluid under pressure supplied to the bore of the casing at one side of the power piston to a position determined by contact of the annular piston of larger diameter with the end of the said liner, in which position the annular piston of smaller diameter is correspondingly in a limit position to determine the limit of movement of the power piston toward the differential piston member, said differential piston member being shiftable by said power piston when fluid under pressure is vented from the said one side thereof and supplied to the opposite side thereof, to a different position in which the annular piston of smaller diameter is in a correspondingly different limit position to determine the limit of movement of said power piston in the direction of said differential piston member.

3. A fluid motor as claimed in claim 2, further characterized in having a member securable in any one of a plurality of different positions with respect to said differential piston member and adapted to contact the casing at the end of the bore to selectively alter the amount of axial spacing between the two limit positions of the annular piston of smaller diameter for varying the amount of movement of the power piston between the said two limit positions from a chosen maximum to zero.

4. A fluid motor as claimed in claim 2, further characterized by a tubular stop member having threaded engagement with the interior of the tubular means connecting the annular pistons of the differential piston member, and screw-threaded locking means for locking said tubular stop member in any one of a plurality of positions relative to the tubular means, said stop member being of such length and adapted to contact the casing at one end of the bore to selectively alter the amount of axial spacing between the two limit positions provided by the annular piston of smaller diameter for limiting the movement of the power piston betwen the said two limit positions from a chosen maximum to zero.

5. A fluid motor device comprising a casing having a main portion in which is a cylindrical bore, adapted to be closed at opposite ends by end portions of said casing, a cylindrical liner of a length shorter than the bore of said casing and removably secured therein with the ends of the said liner in substantially equally spaced relation with respect to the corresponding ends of the bore in the casing, said liner having a through bore of a diameter less than the diameter of the bore in the casing, a double-acting power piston slidably operable in the bore of said liner and having an operating rod secured thereto which projects slidably through one of the end portions of said casing, a pair of differential piston members, each of which comprises two annular pistons of different outer diameters respectively and connected in axially spaced relation by a tubular member, one of said differential piston members having its larger diameter annular piston slidably operable in the bore of said casing at one end of the said liner with the smaller diameter annular piston slidably operable in the bore of the liner at the corresponding end thereof, the other of said differential piston members having its larger diameter annular piston slidably operable in the bore of said casing at the opposite side of said liner with its smaller diameter annular piston slidably operable in the bore of the liner at the corresponding end thereof, said differential piston members being shiftable selectively in one direction or the other to coaxially spaced limiting positions for said power piston responsively to the supply of fluid under pressure to or the venting of fluid under pressure from the corresponding side of the power piston.

6. A control valve device comprising a casing having a cylindrical bore therein providing a sealed chamber to which fluid under pressure may be constantly supplied, a rotary valve member having an operating shaft coaxial to the bore and extending exteriorly of said casing whereby rotary movement of the valve member in said bore may be effected, said rotary valve member having an atmospheric exhaust port opening at the exterior of the valve member and connected to a passageway in said shaft which passageway is constantly open to atmosphere at the exterior end of the shaft, a plurality of ports in said casing opening into said bore, said ports being in angularly spaced relation and communicating via passageways in said casing with a device to be controlled, said rotary valve member being rotatable selectively from one position, in which all of said ports are open to said bore and in which communication is established via which fluid under pressure may be supplied from said bore through all of said ports to the device to be controlled, to another position, in which the exhaust port in said rotary valve member registers respectively with only one of the ports opening into said bore and establishes communication via which fluid under pressure is vented to atmosphere from the correspondingly controlled portion of the device controlled while all of the other ports remain open to said bore so that fluid under pressure is supplied via the corresponding passageways to the device to be controlled.

7. A control valve device as claimed in claim 6, further characterized by a plurality of rows of ports opening into the bore of the casing and communicating respectively via passageways in said casing with a device or devices to be controlled, each row of ports consisting of a plurality of angularly spaced ports in one plane with which the exhaust port in said valve member may be brought into registration by rotation of said valve member, said valve member being shiftable axially in said bore into coplanar alignment with a selected one of said rows of ports, thereby to effect selective registration of the exhaust port in said valve member with any selected one of the ports opening into the bore by rotation of the valve member while in alignment with the corresponding row of ports in which said selected one of the ports is located.

8. A fluid motor comprising a casing having a plurality of spaced-apart parallel bores, a liner mounted in each of said bores, the liners being substantially less in length than the corresponding bores and so anchored therein that each end thereof is spaced inward from the corresponding end of the respective bore, a double-acting power piston slidably mounted in each of said liners, a differential piston member disposed on each side of each of said double-acting power pistons, each differential piston member having two pistons of different diameter connected in spaced relation by a tubular portion, the smaller diameter piston being slidably mounted in the corresponding liner and the larger diameter piston being slidably mounted in the bore of the casing in which said corresponding liner is anchored, a pair of axially spaced stops for each of said differential pistons, one of said stops being on one end of the corresponding liner and the other of said stops being on a pressure head for closing the corresponding end of the bore in which the liner is mounted, and means carried by each of said differential pistons for variably limiting the movement of the larger diameter piston from one of said stops to the other, each of said power pistons and its corresponding differential piston cooperating respectively with the corresponding limiting means and pair of stops to provide a series of axially spaced definite positions for each of said power pistons.

9. A manually operated control valve device, comprising in combination, a casing having therein a bore and two coaxial counterbores of unequal diameter, a plurality of delivery ports extending through said casing from an exterior surface thereon and opening at one end at the surface of the smaller of said counterbores, a supply port extending through said casing from said exterior surface and opening at one end at the surface of the end of said smaller counterbore, a valve element, means carried in said bore and the larger of said counterbores for mounting said valve element for slidable and rotatable movement within said smaller counterbore to any one of a plurality of positions to, in certain of said positions corresponding in number to the number of said delivery ports, close communication between said supply port and only one of said delivery ports and establish a communication between said one delivery port and atmosphere, and to, in all other of said plurality of positions, establish a communication between said supply port and all of said delivery ports, an operating handle, means providing a driving connection between said valve element and said handle whereby said valve element may be moved by said handle to any one of its plurality of positions, and guide means providing a chosen path in which said handle may move, said guide means preventing movement of said valve element by said handle to different ones of said certain positions except as said handle is rocked in one direction or in an opposite direction from one or another spaced-apart positions lying in a straight line, in each of which spaced-apart positions said handle positions said valve element in one of said other positions in which a communication is established between said supply port and all of said delivery ports.

10. A fluid motor comprising a casing having a plurality of spaced-apart parallel bores, a liner mounted in each of said bores, the liners being substantially less in length than the corresponding bores and so anchored therein that each end thereof is spaced inward the same distance from the corresponding end of the respective bore, a double-acting power piston slidably mounted in each of said liners, a differential piston member disposed adjacent each end of each of said liners, each differential piston member having two spaced-apart pistons of different diameter connected by an internally threaded tubular portion, the smaller diameter piston being slidably mounted in the corresponding liner and the larger diameter piston being slidably mounted in the bore of the casing in which said corresponding liner is anchored, a pair of axially spaced-apart stops for the larger diameter piston of each of said differential pistons, one of said stops being formed on the adjacent end of the corresponding liner and the other of said stops being formed on the inner face of a pressure head for closing the adjacent end of the corresponding bore in which the liner is mounted, a plurality of externally threaded adjustable sleeves each carried by one of said differential piston members in screw-threaded engagement with the internally threaded tubular portion thereof to be shifted with respect to the respective one differential piston member for variably limiting the movement of the larger diameter piston thereof from the corresponding said one stop to the other, and a plurality of externally threaded lock nuts each carried by one of said differential piston members in screw-threaded engagement with the internally threaded tubular portion thereof for locking the corresponding externally threaded adjustable sleeve in any adjusted position relative to said internally threaded tubular portion, each of said power pistons and the corresponding differential piston members disposed adjacent the opposite ends of the corresponding liner in which the respective power piston is slidably mounted cooperating respectively with the corresponding adjustable sleeve and pair of stops to provide a series of axially spaced definite positions for each of said power pistons.

11. A control valve device as claimed in claim 9, further characterized in having yieldable means for maintaining said valve element in any one of its plurality of positions against movement therefrom by vibration imparted to said casing.

12. A control valve device as claimed in claim 9, further characterized in that said valve element is generally cylindrical and has on its peripheral surface a plurality of spaced-apart parallel arranged serrations, and further including a spring pressed detent engaged in said serrations so as to maintain said valve element in any one of its plurality of positions against movement therefrom by vibration imparted to said casing while enabling axial movement of the valve element.

13. In combination, a fluid motor comprising a sectionalized casing having a plurality of parallel and spaced-apart related bores, a pressure head for closing each end of each of said bores, a plurality of liners, each mounted in one of said bores with the opposite ends thereof equally spaced inward from the corresponding ends of the bore in which the respective liner is disposed, a plurality of power pistons each mounted for shifting in either direction in one of said liners when subjected on the opposite faces thereof to a differential of forces, a pair of differential piston stop members for each power piston, each of which comprises two annular pistons of different outside diameter respectively and connected in axially spaced relation by an internally threaded tubular member, the smaller diameter pistons of each pair of differential piston stop members being shiftably mounted in the corresponding liner on opposite sides of the power piston therein and the larger diameter pistons of each pair of differential piston stop members being shiftably mounted in the end portions of the bore in which the corresponding liner is disposed, said differential piston stop members of each pair of differential piston stop members being selectively simultaneously shiftable in opposite directions toward the corresponding power piston by fluid under pressure acting thereon to position the respective power piston in a central position or each individually shiftable in the opposite direction into contact with a corresponding pressure head by said corresponding power piston in response to the supply of fluid under pressure to one side of said corresponding power piston to position said power piston at one side of said central position, and adjustable means carried by each of said differential piston stop members for variably limiting the movement thereof in said opposite direction, a source of fluid under pressure, a supply conduit connected at one end to said source of fluid under pressure, a plurality of delivery conduits through which fluid under pressure may be delivered to and released from the opposite sides of said differential piston stop members and said power pistons, and a manually operable control valve device for controlling the supply of fluid under pressure from said source to all of said delivery conduits simultaneously and the selective release of fluid under pressure from only any one of said delivery conduits at any one time, said control valve device comprising a casing having a bore, a supply passageway therein connected at one end to the other end of said supply conduit and opening at its opposite end onto an end wall of said bore, and a plurality of delivery passageways, each delivery passageway being connected at one end to one of said delivery conduits and opening at its opposite end onto the peripheral surface of said bore, the axes of said opposite ends of said delivery passageways being arranged in equally arcuately spaced pairs in parallel planes perpendicular to the axis of said bore, a generally cylindrical valve element rotatably and shiftably mounted in said bore, said valve element having a cylindrical exhaust passageway extending therethrough and opening at one end onto the peripheral surface thereof and at the opposite end to atmosphere, and means for selectively positioning said valve element so that the axis of said one end of said cylindrical exhaust passageway is co-planar with any one of said parallel planes and coaxial with one co-planar axis of one opposite end of one of the delivery passageways of the respective pair of delivery passageways in the respective plane.

14. A manually operable control valve device for controlling simultaneously the supply of fluid under pressure to a plurality of conduits or the release of fluid under pressure from any one of said plurality of conduits while simultaneously maintaining the supply of fluid under pressure to all of the remaining conduits, said control valve device comprising a casing having a bore, two coaxial counterbores of unequal diameter, a supply passageway extending therethrough opening at one end onto the exterior surface of the casing and opening at the other end onto the end wall of the smaller of said coaxial counterbores, and a plurality of delivery passageways extending therethrough opening at one end onto the exterior surface of the casing and opening at the other end onto the peripheral surface of said smaller coaxial counterbore, the axes of said other ends of said delivery passageways being arranged in equally arcuately spaced pairs in parallel planes perpendicular to the axis of said bore and coaxial counterbores, a generally cylindrical valve element having an exhaust passageway extending therethrough so that one end opens onto the peripheral surface thereof and the other end opens to atmosphere, a shaft secured to each end of said generally cylindrical valve element, one of said shafts being rotatably and shiftably mounted in said bore, bearing means carried in the larger of said coaxial counterbores for supporting said other shaft whereby said shafts rotatably and shiftably mount said generally cylindrical valve element in the smaller of said coaxial counterbores so that said one end of said exhaust passageway in said valve element can be moved into alignment with the said one end of any one of said plurality of delivery passageways, an operating handle of cruciform cross section having four arms at right angles and of equal length and width, said handle being secured to said other shaft for selectively rotating and shifting said generally cylindrical valve element, and guide means for said operating handle comprising a pair of identical parallel spaced-apart guide elements oppositely arranged in cooperative relation, each guide element having a plurality of parallel spaced-apart slots each slightly greater in length than the length of one arm of the cruciform of said handle whereby each slot is adapted to receive one of said arms in response to successively shifting said valve element by means of said handle to certain ones of a plurality of positions and subsequently rotating said valve element in one direction or in an opposite by means of said handle until said one end of said exhaust passageway in said valve element is positioned in alignment with said one end of one or the other of a pair of said co-planar delivery passageways, in which position one of said four arms is disposed in a corresponding slot in one guide element.

References Cited in the file of this patent

UNITED STATES PATENTS

| | | |
|---|---|---|
| 767,732 | Bromley | Aug. 16, 1904 |
| 1,055,781 | Mitchell et al. | Mar. 11, 1913 |
| 1,836,962 | Goldman | Dec. 15, 1931 |
| 2,234,009 | Robinson | Mar. 4, 1941 |
| 2,251,293 | Schwartz et al. | Aug. 5, 1941 |
| 2,350,662 | Adams et al. | June 6, 1944 |
| 2,524,488 | Stevens | Oct. 3, 1950 |
| 2,671,431 | Zumbusch | Mar. 9, 1954 |

FOREIGN PATENTS

| | | |
|---|---|---|
| 289,962 | Great Britain | May 7, 1928 |